US009705409B2

(12) United States Patent
Yamaoka et al.

(10) Patent No.: US 9,705,409 B2
(45) Date of Patent: Jul. 11, 2017

(54) EQUATIONS FOR AN LLC CONVERTER HAVING INCREASED POWER OUTPUT CAPABILITIES

(71) Applicant: Panasonic Intellectual Property Management Co., Ltd., Osaka (JP)

(72) Inventors: Masahiro Yamaoka, Osaka (JP); Takehiko Yamakawa, Osaka (JP); Akira Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/933,592

(22) Filed: Nov. 5, 2015

(65) Prior Publication Data

US 2016/0172982 A1    Jun. 16, 2016

(30) Foreign Application Priority Data

Dec. 15, 2014    (JP) ................. 2014-252616

(51) Int. Cl.
*H02M 3/335*    (2006.01)
*H01F 21/00*    (2006.01)
*H02M 3/337*    (2006.01)
*H01F 30/12*    (2006.01)
*H02M 1/00*    (2006.01)

(52) U.S. Cl.
CPC ........ *H02M 3/33523* (2013.01); *H01F 21/00* (2013.01); *H01F 30/12* (2013.01); *H02M 3/3378* (2013.01); *H02M 2001/0058* (2013.01); *Y02B 70/1491* (2013.01)

(58) Field of Classification Search
CPC ..................... H02M 3/335–3/33592

USPC .......................... 363/15–17, 98, 21.02–21.03
See application file for complete search history.

(56) References Cited

U.S. PATENT DOCUMENTS

| | | | |
|---|---|---|---|
| 2002/0054498 A1 | 5/2002 | Cho et al. | |
| 2012/0020122 A1* | 1/2012 | Fornage | H02M 3/33515 363/21.12 |
| 2016/0365801 A1* | 12/2016 | Phadke | H02M 3/33546 |

FOREIGN PATENT DOCUMENTS

WO    01/71896    9/2001

OTHER PUBLICATIONS

Choi, Hangseok. "Design Consideratios for an LLC Resonant Converter" Farichild Semiconductor. Farichild Semiconductor Power Semnar, 2007. pp. A1-A8.*

(Continued)

*Primary Examiner* — Harry Behm
*Assistant Examiner* — Peter Novak
(74) *Attorney, Agent, or Firm* — McDermott Will & Emery LLP (57) ABSTRACT

A power converter includes a transformer including a transformer including a primary winding and a secondary winding magnetically coupled to the primary winding, a bridge circuit including a switching element, and an inductor. A direct current voltage is converted into an alternating current voltage by turning on and off the switching element in the bridge circuit. An output voltage in the secondary winding is induced by supplying the alternating current voltage to the primary winding. The inductor is disposed on a path connecting the switching element and the primary winding. A resonance inductance value Lr including a leakage inductance value of the transformer and an inductance value of the inductor satisfies Formula 1.

10 Claims, 6 Drawing Sheets

(56) References Cited

OTHER PUBLICATIONS

Jee-hoon Jung and Joong-gi Kwon, "Theoretical analysis and optimal design of LLC resonant converter," 2007 European Conference on Power Electronics and Applications, Aalborg, 2007, pp. 1-10.*
J. F. Lazar and R. Martinelli, "Steady-state analysis of the LLC series resonant converter," APEC 2001. Sixteenth Annual IEEE Applied Power Electronics Conference and Exposition (Cat. No. 01CH37181), Anaheim, CA, 2001, pp. 728-735 vol. 2.*

* cited by examiner

EQUATIONS FOR AN LLC CONVERTER HAVING INCREASED POWER OUTPUT CAPABILITIES

BACKGROUND

1. Technical Field

The present disclosure relates to a power converter (for example, a switching power-supply unit) used for power conversion or the like.

2. Description of the Related Art

Japanese Patent No. 3682773 proposes a switching power-supply unit including capacitors and an inductor that form a resonance circuit.

SUMMARY

In the related art, it is not possible to maximize power output from a power converter.

In one general aspect, the techniques disclosed here feature a power converter including a transformer including a primary winding and a secondary winding magnetically coupled to the primary winding, a bridge circuit including a switching element, and an inductor. A direct current voltage is converted into an alternating current voltage by turning on and off the switching element in the bridge circuit. An output voltage in the secondary winding is induced by supplying the alternating current voltage to the primary winding. The inductor is disposed on a path connecting the switching element and the primary winding. A resonance inductance value Lr including a leakage inductance value of the transformer and an inductance value of the inductor satisfies Formula 1.

According to the present disclosure, the power output from the power converter can be maximized.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION

Hereinafter, embodiments of the present disclosure will be described with reference to the drawings.

First, the focus of attention of the inventor of the present disclosure will be described. In the configuration described in Japanese Patent No. 3682773, the resonance inductor has an inductance value considerably higher than a minimum needed value, that is, an inductance value higher than a needed value. The embodiments will be described as examples of configurations to solve the difficulty in the related art.

Embodiment 1

Figure 1:
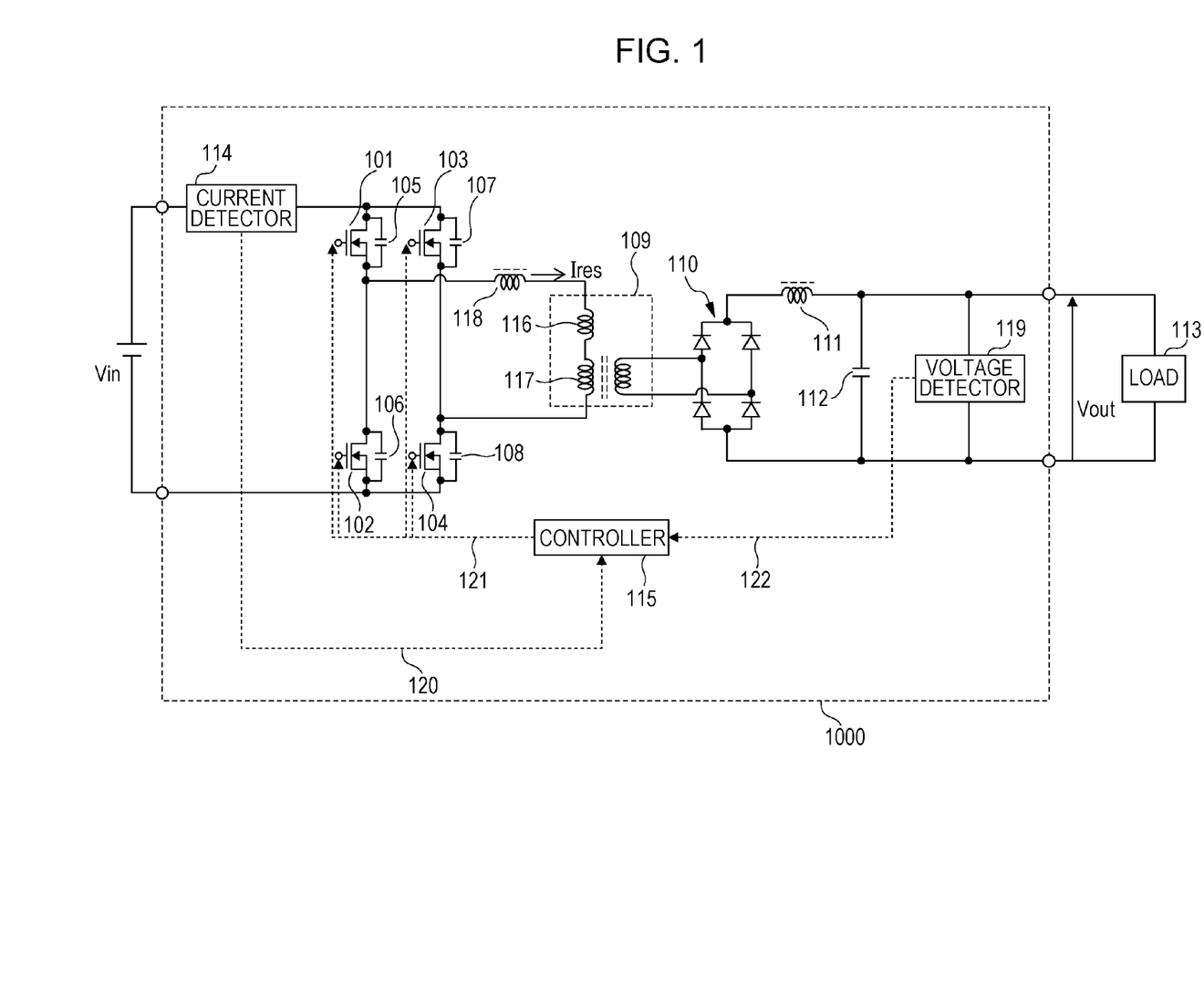
FIG. 1 is a circuit diagram illustrating a schematic configuration of a power converter 1000 in Embodiment 1.

FIG. 1 is a circuit diagram illustrating a schematic configuration of a power converter 1000 in Embodiment 1.

The power converter 1000 in Embodiment 1 includes a transformer 109, a bridge circuit, and an inductor 118.

The transformer 109 includes a primary winding and a secondary winding magnetically coupled to the primary winding.

The bridge circuit includes switching elements.

A DC voltage is converted into an alternating current (AC) voltage by turning on and off the switching elements in the bridge circuit. The DC voltage may be input from an DC power supply or from an AC/DC circuit, a DC/DC circuit, or the like.

An output voltage in the secondary winding is induced by supplying the AC voltage to the primary winding.

The inductor 118 is disposed on a path connecting the switching element and the primary winding.

Here, a value of a capacitance component between a first terminal and a second terminal of each switching element is denoted by C(F).

A voltage value of the DC voltage is denoted by Vin(V).

A peak value of current flowing through the inductor 118 is denoted by Ipeak(A).

An average value of the current flowing through the inductor 118 is denoted by Iave(A).

In this case, a resonance inductance value Lr(H) including a leakage inductance value of the transformer 109 and an inductance value of the inductor 118 satisfies the following Formula 1.

$$\frac{2CV_{in}^2}{I_{ave}^2} \geq L_r \geq \frac{2CV_{in}^2}{I_{peak}^2} \quad \text{(Formula 1)}$$

According to the configuration described above, the resonance inductance value Lr can be lowered. This can reduce a time for regenerating power input from a resonance inductor to the DC-voltage input side. This increases a time for transmitting the power from the DC-voltage input side to a load. This can consequently maximize power output from the power converter.

In addition, lowering the resonance inductance value Lr can reduce power for charging and discharging the resonance inductor. This can reduce an amount of current reciprocating between the DC-voltage input side and the resonance inductance. This can thereby prevent the deterioration of the power conversion efficiency of the power converter.

In addition, the size of an externally provided resonance inductor can be reduced. This can reduce the size of the power converter.

As illustrated in FIG. 1, the power converter 1000 in Embodiment 1 may include, as the switching elements of the bridge circuit, a first switching element 101, a second switching element 102, a third switching element 103, and a fourth switching element 104.

In this case, as illustrated in FIG. 1, the first and third switching elements 101 and 103 disposed on an upper arm and the second and fourth switching elements 102 and 104 disposed on a lower arm may form a full bridge circuit.

Each of the first, second, third, and fourth switching elements 101, 102, 103, and 104 may be a metal-oxide-semiconductor field-effect transistor (MOSFET). Alternatively, switching elements of a type different from the MOSFET (such as three-terminal switching elements) may be used as the switching elements.

Each switching element is controlled to be turned on or off by using a drive voltage 121 from a controller 115.

The power converter 1000 in Embodiment 1 may include a current detector 114. The power converter 1000 in Embodiment 1 may also include a voltage detector 119.

In this case, the controller 115 may generate the drive voltage 121 on the basis of a current detection signal 120 from the current detector 114 and a voltage detection signal 122 from the voltage detector 119.

Note that the bridge circuit may be a half bridge circuit.

Reference numerals 105, 106, 107, and 108 in FIG. 1 each denote a capacitance component between the first terminal and the second terminal of the corresponding switching element (for example, between a source and a drain).

The reference numerals 105 to 108 in FIG. 1 may also each denote a parasitic capacitance between the first terminal and the second terminal of the corresponding switching element.

Alternatively, the power converter 1000 in Embodiment 1 may include a first capacitor, a second capacitor, a third capacitor, and a fourth capacitor.

In this case, each of the first to fourth capacitors may be connected parallel to the first terminal and the second terminal of a corresponding one of the first to fourth switching elements.

In this case, the capacitance component between the first terminal and the second terminal of each switching element (each of the capacitance components 105 to 108 in FIG. 1) includes the parasitic capacitance of the corresponding switching element and the capacitance of the corresponding capacitor.

According to the configuration described above, even if the parasitic capacitance is not sufficient as a capacitance, or even if a three-terminal switching element without a capacitance is used, zero-voltage switching (ZVS) can be achieved using the capacitance of each capacitor.

The capacitance components each between the first terminal and the second terminal of the corresponding switching element form a resonance circuit together with a leakage inductance 116 of the transformer 109 and the inductor 118 that is an externally provided resonance inductor.

For easy understanding of the circuit diagram, FIG. 1 illustrates the transformer 109 in such a manner that the leakage inductance 116 and an ideal transformer 117 are separated from each other.

As illustrated in FIG. 1, the power converter 1000 in Embodiment 1 may further include a diode bridge 110, a choke coil 111, and a smoothing capacitor 112.

In this case, the diode bridge 110 rectifies an output voltage from the secondary winding of the transformer 109. The choke coil 111 and the smoothing capacitor 112 smooth the rectified output voltage.

If a condition in the following Formula 2 holds true, a capacitance needed for turning on/off the corresponding switching element is charged/discharged by using energy stored in the resonance inductance. This achieves ZVS, thus reducing a switching loss.

$$2 \times \tfrac{1}{2} C V_{in}^2 \leq \tfrac{1}{2} L_r I_{res}^2 \qquad \text{(Formula 2)}$$

Note that Ires(A) in Formula 2 above denotes a value of current flowing through an externally provided resonance inductor.

Figure 2:
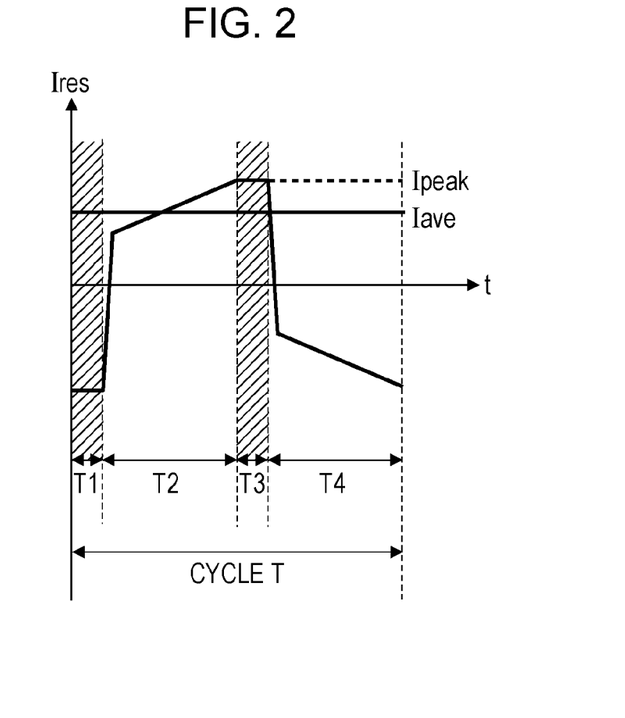
FIG. 2 is a diagram illustrating a time waveform of a current Ires flowing through an externally provided resonance inductor.
Figure 3:
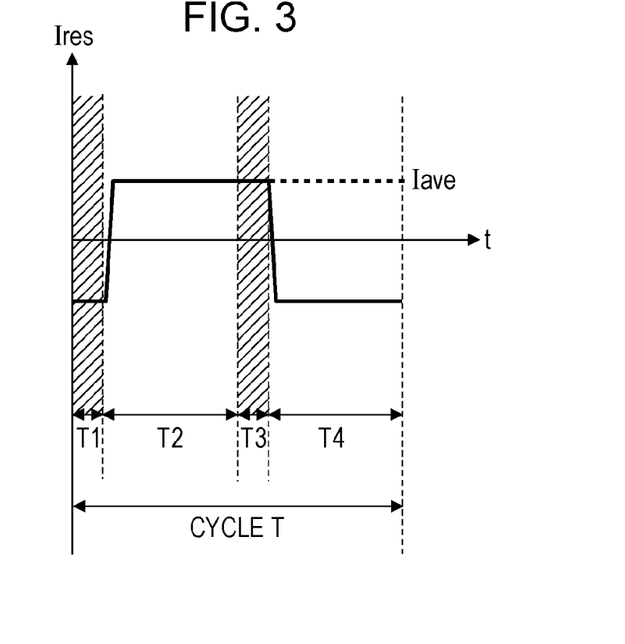
FIG. 3 is a diagram illustrating a time waveform of the current Ires flowing through the externally provided resonance inductor.

FIGS. 2 and 3 are each a diagram illustrating a time waveform of the current Ires flowing through the externally provided resonance inductor.

FIGS. 2 and 3 each illustrate a waveform of current in one cycle of a drive frequency of each switching element.

In FIGS. 2 and 3, the state of each switching element is switched between an on state and an off state in a period T1 and a period T3.

In FIGS. 2 and 3, the first switching element 101 and the fourth switching element 104 are in the on state in a period T2.

In FIGS. 2 and 3, the second switching element 102 and the third switching element 103 are in the on state in a period T4.

In FIGS. 2 and 3, Iave denotes an average value of |Ires|.

As understood from FIG. 2, even if a constant current is output from a power converter, the value of Ires changes with the elapse of time.

The waveform of Ires changes depending on not only the resonance inductance value Lr but also the output from the power converter, an inductance value Lchk of the choke coil 111, and the like.

The value Ipeak in FIG. 2 is a value of Ires in one of the periods in which the state of each switching element is switched between the on and off states.

If the value Ipeak is used, Formula 2 above is changed to the following Formula 3 and Formula 4.

$$2 \times \frac{1}{2} C V_{in}^2 \leq \frac{1}{2} L_r I_{peak}^2 \qquad \text{(Formula 3)}$$

$$L_r \geq \frac{2 C V_{in}^2}{I_{peak}^2} \qquad \text{(Formula 4)}$$

Specifically, the resonance inductance value Lr in Embodiment 1 is equal to or higher than a resonance inductance value Lr obtained by using Formula 4 above.

Meanwhile, an excessively high resonance inductance value Lr causes the following difficulty.

Specifically, the size of the externally provided resonance inductor increases. In addition, a long time is needed for energy stored in the resonance inductor to be regenerated for the power supply. This limits a time for transmitting the power from the power source to the load. This results in a limitation on power output from the power converter. Moreover, charging and discharging the resonance inductor increases reciprocation of the current between the power supply and the power converter. This thereby deteriorates the power conversion efficiency.

Suppose a case where a circuit operating condition is set in such a manner that the inductance value Lchk of the choke coil 111 is maximized to minimize the ripple of the output voltage, as illustrated in FIG. 3.

This prevents the current from increasing in the period in which the switching element is in the on state. Accordingly, it is understood that the resonance inductance value Lr needed for resonance is maximized.

If the average value Iave in FIG. 3 of the current flowing through the externally provided resonance inductor is used, Formula 2 above is changed to the following Formula 5 and Formula 6.

$$2 \times \frac{1}{2} CV_{in}^2 \geq \frac{1}{2} L_r I_{ave}^2 \quad \text{(Formula 5)}$$

$$L_r \leq \frac{2CV_{in}^2}{I_{ave}^2} \quad \text{(Formula 6)}$$

Specifically, in Embodiment 1, the upper limit of the resonance inductance value Lr is set as a resonance inductance value Lr obtained in accordance with Formula 6 above.

Formulas 4 and 6 above lead to the following Formula 1.

$$\frac{2CV_{in}^2}{I_{ave}^2} \geq L_r \geq \frac{2CV_{in}^2}{I_{peak}^2} \quad \text{(Formula 1)}$$

A resonance inductor satisfying the relation in Formula 1 above is designed and used in Embodiment 1.

This can reduce the size of the externally provided resonance inductor, maximize the output power, and improve the circuit efficiency.

Note that if there are variations in capacitance components of the respective switching elements, the following configuration may be used.

A value of the capacitance component between the first terminal and the second terminal of the first switching element 101 is denoted by C1.

A value of the capacitance component between the first terminal and the second terminal of the second switching element 102 is denoted by C2.

A value of the capacitance component between the first terminal and the second terminal of the third switching element 103 is denoted by C3.

A value of the capacitance component between the first terminal and the second terminal of the fourth switching element 104 is denoted by C4.

In this case, a resonance inductor having a resonance inductance value Lr that satisfies both the following Formula 7 and Formula 8 may be designed and used.

$$\frac{(C_1 + C_2)V_{in}^2}{I_{ave}^2} \geq L_r \geq \frac{(C_1 + C_2)V_{in}^2}{I_{peak}^2} \quad \text{(Formula 7)}$$

$$\frac{(C_3 + C_4)V_{in}^2}{I_{ave}^2} \geq L_r \geq \frac{(C_3 + C_4)V_{in}^2}{I_{peak}^2} \quad \text{(Formula 8)}$$

The configuration described above can achieve ZVS for each of the first to fourth switching elements of the bridge circuit and lower the resonance inductance value Lr.

Note that in Embodiment 1, the inductance value of the inductor 118 may vary in accordance with the current flowing through the inductor 118.

In other words, an inductor whose inductance value varies in accordance with the current may be used as an externally provided resonance inductor.

In this case, a resonance inductance value Lr that satisfies the resonance condition of Formula 2 above in accordance with change in the current Ires flowing through the resonance inductor is obtained.

According to the configuration described above, an optimum inductance value that satisfies the resonance condition in accordance with the current Ires flowing through the resonance inductor is obtained. This can improve the efficiency in a wide operating region of the power converter.

Note that in Embodiment 1, the inductance value of the inductor 118 may vary due to DC superposition.

Specifically, a variable inductor whose inductance value varies due to the DC superposition characteristic of a magnetic core of a resonance inductor may be used as the externally provided resonance inductor.

Figure 4:
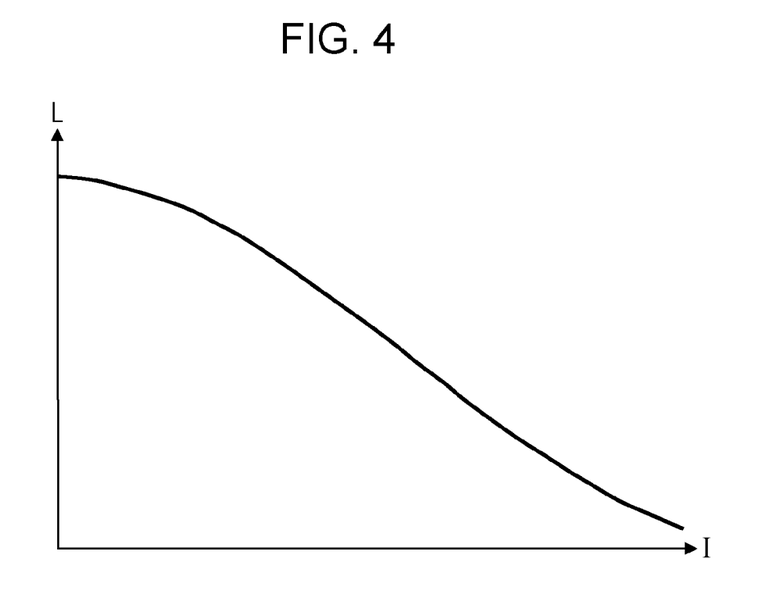
FIG. 4 is a diagram illustrating a direct current (DC) superposition characteristic.

FIG. 4 is a diagram illustrating a DC superposition characteristic.

As illustrated in FIG. 4, a magnetic material of a magnetic core has a DC superposition characteristic in which an inductance value is lowered with the increase of current flowing through the magnetic material. Utilization of the characteristic enables the inductance value to be lowered with the increase of the current Ires flowing through the resonance inductance. This enables designing resonance inductance having the resonance inductance value Lr satisfying Formula 2 above in accordance with the value of the current Ires.

The configuration described above eliminates the need for providing a control circuit or the like for changing the inductance value of the resonance inductor. This enables further size reduction of the switching power-supply unit.

Figure 5:
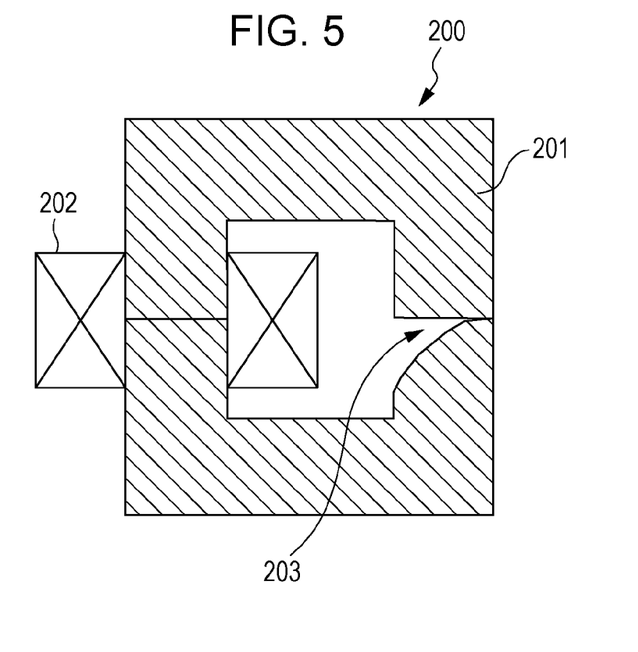
FIG. 5 is a diagram illustrating a schematic configuration of a resonance inductor 200.

FIG. 5 is a diagram illustrating a schematic configuration of a resonance inductor 200.

As illustrated in FIG. 5, the externally provided resonance inductor 200 includes a magnetic core 201 and a coil 202. The resonance inductor 200 is provided with a gap adjuster 203. Appropriate selection of the shape of the gap adjuster 203 enables a variable inductor whose inductance value varies in accordance with the current flowing through the resonance inductor 200.

However, the gap adjuster 203 has a small area of contact with the magnetic core material. This increases a loss of the magnetic core.

Hence, in Embodiment 1, the externally provided resonance inductor may have a configuration in which a gap is not provided in the magnetic core material.

The configuration described above prevents an increase in the loss of the magnetic core caused by gap insertion in the magnetic core material. This can improve the power conversion efficiency of the power converter.

Embodiment 2

Hereinafter, Embodiment 2 will be described. Note that detailed description of the same components as those in Embodiment 1 is omitted as appropriate.

Figure 6:
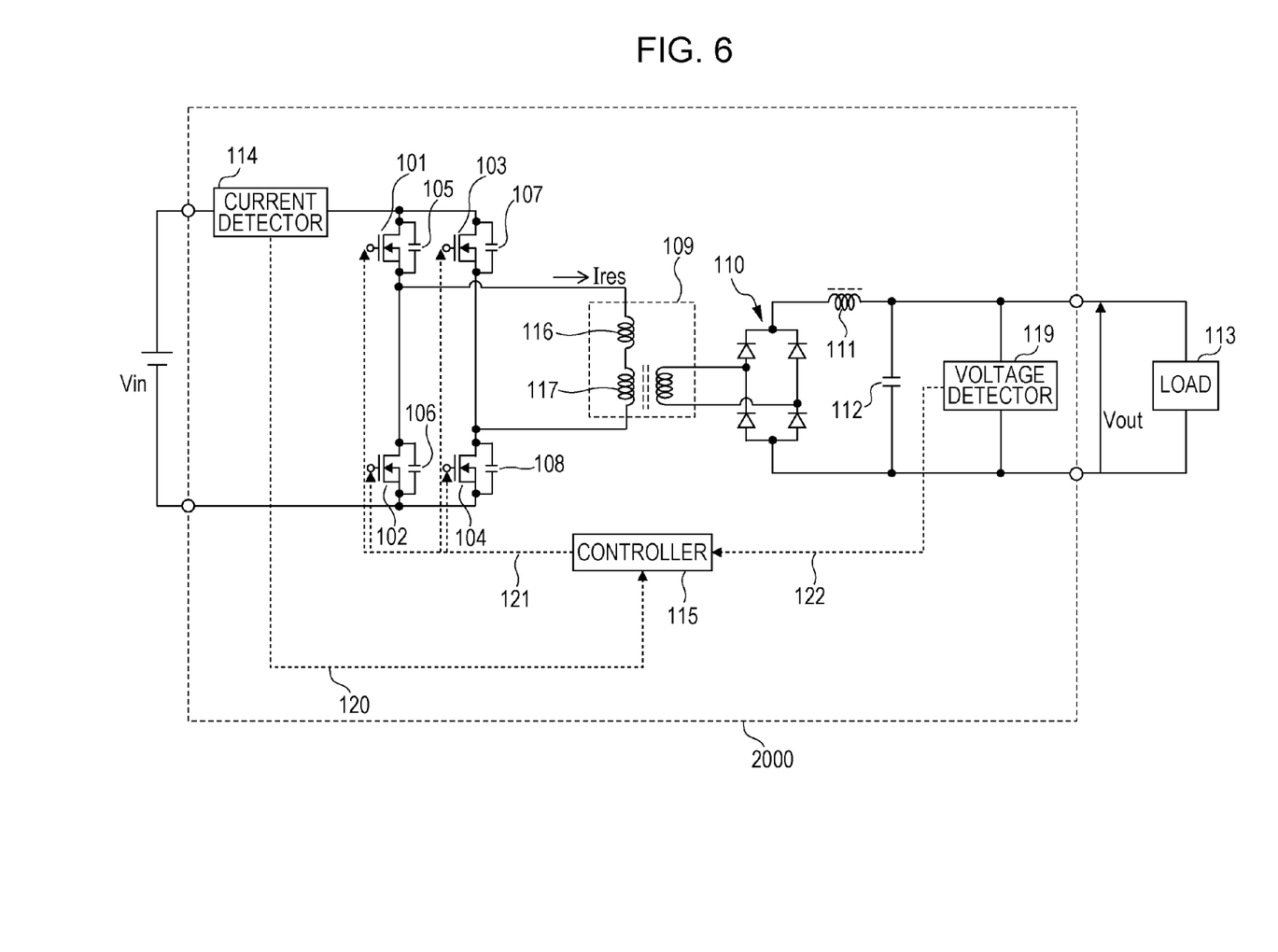
FIG. 6 is a circuit diagram illustrating a schematic configuration of a power converter 2000 in Embodiment 2.

FIG. 6 is a circuit diagram illustrating a schematic configuration of a power converter 2000 in Embodiment 2.

The power converter 2000 in Embodiment 2 includes the transformer 109 and a bridge circuit.

The transformer 109 includes the primary winding and the secondary winding magnetically coupled to the primary winding.

The bridge circuit includes the switching elements.

A DC voltage is converted into an AC voltage by turning on and off the switching elements in the bridge circuit. The DC voltage may be input from an DC power supply or from an AC/DC circuit, a DC/DC circuit, or the like.

An output voltage in the secondary winding is induced by supplying the AC voltage to the primary winding.

Here, a value of a capacitance component between a first terminal and a second terminal of each switching element is denoted by C(F).

A voltage value of the DC voltage is denoted by Vin(V).

A peak value of current flowing through the primary winding of the transformer 109 is denoted by Ipeak(A).

An average value of the current flowing through the primary winding of the transformer 109 is denoted by Iave(A).

A leakage inductance value Le(H) of the transformer 109 satisfies the following Formula 9.

$$\frac{2CV_{in}^2}{I_{ave}^2} \geq L_e \geq \frac{2CV_{in}^2}{I_{peak}^2} \quad \text{(Formula 9)}$$

According to the configuration described above, the leakage inductance value Le of a transformer can be lowered. This increases a time for transmitting power from the DC-voltage input side to the load. This can consequently reduce a time for regenerating power input from the transformer to the DC-voltage input side. This can maximize power output from the power converter. In addition, lowering the leakage inductance value Le of the transformer can reduce power consumed for charging and discharging a leakage component of the transformer. This can reduce an amount of current reciprocating between the DC-voltage input side and the transformer. This can thereby prevent the deterioration of the power conversion efficiency of the power converter. In addition, ZVS can be achieved without the externally provided resonance inductor. This can reduce the size of the power converter.

The power converter 2000 in Embodiment 2 does not include the inductor 118 described in Embodiment 1.

In Embodiment 2, the capacitance components each between the first terminal and the second terminal of the corresponding switching element form a resonance circuit together with the leakage inductance 116 of the transformer 109.

For easy understanding of the circuit diagram, FIG. 6 illustrates the transformer 109 in such a manner that the leakage inductance 116 and the ideal transformer 117 are separated from each other.

If a condition in the following Formula 10 holds true, a capacitance needed for turning on/off the corresponding switching element is charged/discharged by using energy stored in a leakage inductance. This achieves ZVS, thus reducing a switching loss.

$$2 \times \tfrac{1}{2} C V_{in}^2 \leq \tfrac{1}{2} L_e I_{res}^2 \quad \text{(Formula 10)}$$

Note that Ires(A) in Formula 10 above denotes a value of current flowing through the leakage inductance.

The lower and upper limits of the leakage inductance in Embodiment 2 is obtained as in the following Formula 9 in the same manner as in Embodiment 1.

$$\frac{2CV_{in}^2}{I_{ave}^2} \geq L_e \geq \frac{2CV_{in}^2}{I_{peak}^2} \quad \text{(Formula 9)}$$

A transformer including a leakage inductance satisfying the relation in Formula 9 above is designed and used in Embodiment 2.

This can satisfy the resonance condition without the externally provided resonance inductor. Accordingly, an output voltage can be maximized, and the circuit efficiency can be improved. Further, the size of the power converter can be reduced further.

Note that if there are variations in capacitance components of the respective switching elements, the following configuration may be used.

A value of the capacitance component between the first terminal and the second terminal of the first switching element 101 is denoted by C1.

A value of the capacitance component between the first terminal and the second terminal of the second switching element 102 is denoted by C2.

A value of the capacitance component between the first terminal and the second terminal of the third switching element 103 is denoted by C3.

A value of the capacitance component between the first terminal and the second terminal of the fourth switching element 104 is denoted by C4.

In this case, a transformer having a leakage inductance value Le that satisfies both the following Formula 11 and Formula 12 may be designed and used.

$$\frac{(C_1 + C_2)V_{in}^2}{I_{ave}^2} \geq L_e \geq \frac{(C_1 + C_2)V_{in}^2}{I_{peak}^2} \quad \text{(Formula 11)}$$

$$\frac{(C_3 + C_4)V_{in}^2}{I_{ave}^2} \geq L_e \geq \frac{(C_3 + C_4)V_{in}^2}{I_{peak}^2} \quad \text{(Formula 12)}$$

The configuration described above can achieve ZVS for each of the first to fourth switching elements of the bridge circuit and lower the leakage inductance value Le of the transformer.

Note that in Embodiment 2, the leakage inductance value Le of the transformer 109 may vary in accordance with the current flowing through the transformer 109.

In other words, a variable inductor whose inductance value Le varies in accordance with the current flowing through the leakage inductor may be used as a leakage inductor of a transformer.

In this case, a leakage inductance value Le that satisfies the resonance condition of Formula 10 above in accordance with a change in the current Ires flowing through the leakage inductor is obtained.

According to the configuration described above, an optimum leakage inductance value Le that satisfies the resonance condition in accordance with the current Ires flowing through the transformer is obtained. This can improve the efficiency in a wide operating region of the power converter.

Note that in Embodiment 2, the leakage inductance value Le of the transformer 109 may vary due to DC superposition.

Specifically, a variable inductor whose leakage inductance value varies due to the DC superposition may be used as the leakage inductor of the transformer.

The configuration described above eliminates the need for providing a control circuit or the like for changing the leakage inductance value Le of the transformer. This enables further size reduction of the switching power-supply unit.

Hereinafter, specific configuration examples will be described by using FIGS. 7A, 7B, and 8.

Figure 7A:
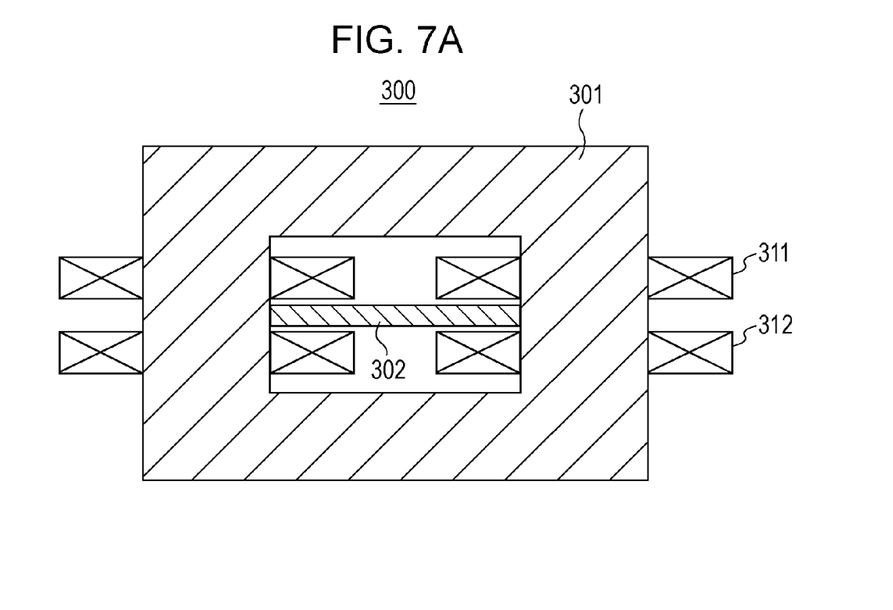
FIGS. 7A and 7B are diagrams illustrating a schematic configuration of a transformer 300 in Embodiment 2.
Figure 7B:
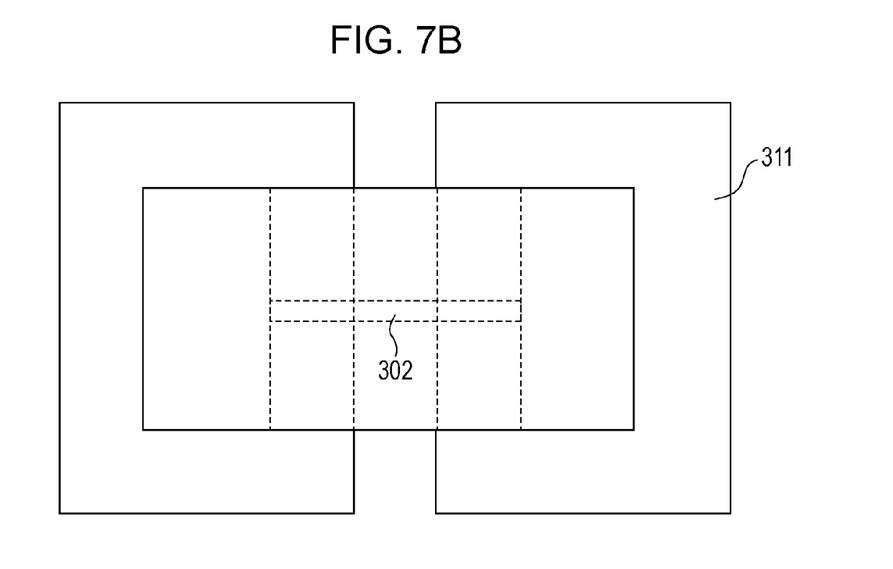

FIGS. 7A and 7B are diagrams illustrating a schematic configuration of a transformer 300 in Embodiment 2. FIG. 7A and FIG. 7B are respectively a side diagram and a plan diagram of the transformer 300.

The transformer 300 illustrated in FIGS. 7A and 7B includes a magnetic core 301, a primary winding 311, a secondary winding 312, and a leakage adjustment bypass 302.

Magnetic flux flowing through the magnetic core 301 is caused to take the bypass through the leakage adjustment bypass 302, and the transformer 300 can thereby form leakage inductance.

The leakage inductance can be adjusted by adjusting the thickness, width, material of the leakage adjustment bypass 302.

Figure 8:
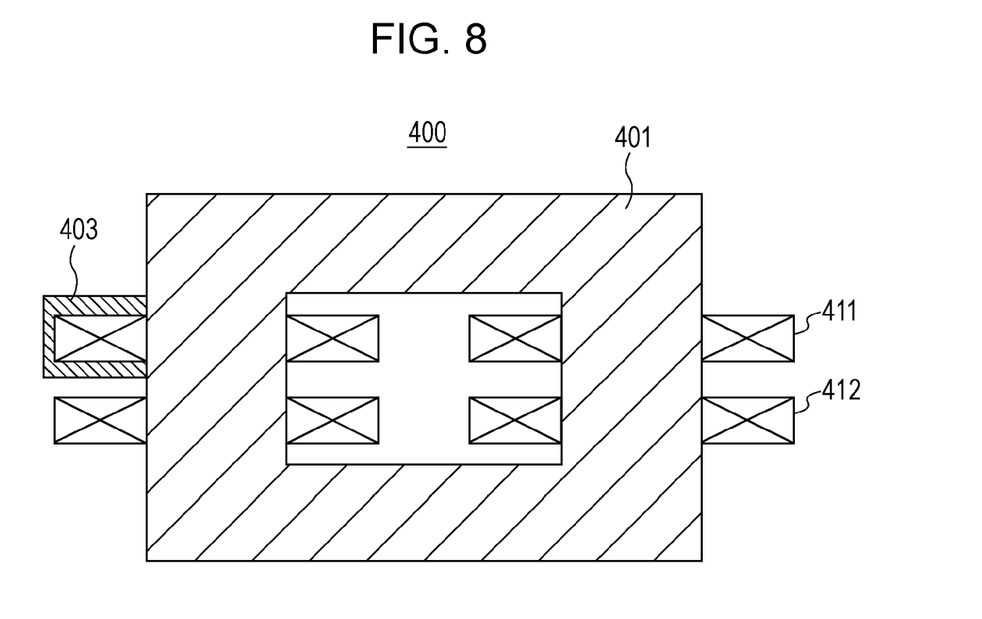
FIG. 8 is a side diagram illustrating a schematic configuration of a transformer 400 in Embodiment 2.

FIG. 8 is a side diagram illustrating a schematic configuration of a transformer 400 in Embodiment 2.

The transformer 400 illustrated in FIG. 8 includes a magnetic core 401, a primary winding 411, a secondary winding 412, and a magnetic cap 403.

Magnetic flux flowing through the magnetic core 401 is caused to take the bypass through the magnetic cap 403, and the transformer 400 can thereby form leakage inductance.

The leakage inductance can be adjusted by adjusting the thickness, width, material of the magnetic cap 403.

As described above, the DC superposition characteristic of the leakage adjustment bypass 302 in FIGS. 7A and 7B or the DC superposition characteristic of the magnetic cap 403 in FIG. 8 may be utilized in Embodiment 2. This can lower the inductance value of the leakage inductor with the increase of the current Ires flowing through the leakage inductor.

In this case, a leakage inductance value Le that satisfies the resonance condition of Formula 10 above in accordance with a change in the current Ires flowing through the leakage inductor is obtained.

The present disclosure is favorably usable for various switching power-supply units such as an on-vehicle power supply and a power conditioner.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A power converter comprising:
   a transformer including a primary winding and a secondary winding magnetically coupled to the primary winding;
   a bridge circuit including a switching element; and
   an inductor,
   wherein a direct current voltage is converted into an alternating current voltage by turning on and off the switching element in the bridge circuit,
   wherein an output voltage in the secondary winding is induced by supplying the alternating current voltage to the primary winding,
   wherein the inductor is disposed on a path connecting the switching element and the primary winding, the inductor having a resonance inductance value Lr, and
   wherein Lr satisfies:

$$\frac{2CV_{in}^2}{I_{ave}^2} \geq L_r \geq \frac{2CV_{in}^2}{I_{peak}^2}$$

where Lr is the resonance inductance value including a leakage inductance value of the transformer and an inductance value of the inductor,
   C is a value of a capacitance component between a first terminal and a second terminal of the switching element,
   Vin is a voltage value of the direct current voltage,
   Ipeak is a peak value of current flowing through the inductor, and
   Iave is an average value of the current flowing through the inductor.

2. The power converter according to claim 1, wherein the inductance value of the inductor varies in accordance with the current flowing through the inductor.

3. The power converter according to claim 2, wherein the inductance value of the inductor varies due to direct current superposition.

4. The power converter according to claim 1,
   wherein the switching element of the bridge circuit includes a first switching element, a second switching element, a third switching element, and a fourth switching element,
   wherein the first switching element and the third switching element that are disposed on an upper arm and the second switching element and the fourth switching element that are disposed on a lower arm form a full bridge circuit, and
   wherein the resonance inductance value Lr satisfies:

$$\frac{(C_1+C_2)V_{in}^2}{I_{ave}^2} \geq L_r \geq \frac{(C_1+C_2)V_{in}^2}{I_{peak}^2} \text{ and,}$$

$$\frac{(C_3+C_4)V_{in}^2}{I_{ave}^2} \geq L_r \geq \frac{(C_3+C_4)V_{in}^2}{I_{peak}^2}$$

where C1 is a value of a capacitance component between a first terminal and a second terminal of the first switching element,
   C2 is a value of a capacitance component between a first terminal and a second terminal of the second switching element,
   C3 is a value of a capacitance component between a first terminal and a second terminal of the third switching element, and
   C4 is a value of a capacitance component between a first terminal and a second terminal of the fourth switching element.

5. The power converter according to claim 4, further comprising:
   a first capacitor; a second capacitor; a third capacitor; and a fourth capacitor,
   wherein each of the first to fourth capacitors is connected parallel to the first terminal and the second terminal of a corresponding one of the first to fourth switching elements,
   wherein the value C1 includes a value of a capacitance component of the first capacitor,
   wherein the value C2 includes a value of a capacitance component of the second capacitor,
   wherein the value C3 includes a value of a capacitance component of the third capacitor, and
   wherein the value C4 includes a value of a capacitance component of the fourth capacitor.

6. A power converter comprising:
   a transformer including a primary winding and a secondary winding magnetically coupled to the primary winding, the transformer having a leakage inductance value Le; and
   a bridge circuit including a switching element,
   wherein a direct current voltage is converted into an alternating current voltage by turning on and off the switching element in the bridge circuit, wherein an output voltage in the secondary winding is induced by supplying the alternating current voltage to the primary winding, and wherein Le satisfies:

$$\frac{2CV_{in}^2}{I_{ave}^2} \geq L_e \geq \frac{2CV_{in}^2}{I_{peak}^2}$$

where

C is a value of a capacitance component between a first terminal and a second terminal of the switching element, Vin is a voltage value of the direct current voltage, Ipeak is a peak value of current flowing through the primary winding of the transformer, and Iave is an average value of the current flowing through the primary winding of the transformer.

7. The power converter according to claim 6, wherein the leakage inductance value Le of the transformer varies in accordance with the current flowing through the transformer.

8. The power converter according to claim 7, wherein the leakage inductance value Le of the transformer varies due to direct current superposition.

9. The power converter according to claim 6, wherein the switching element of the bridge circuit includes a first switching element, a second switching element, a third switching element, and a fourth switching element, wherein the first switching element and the third switching element that are disposed on an upper arm and the second switching element and the fourth switching element that are disposed on a lower arm form a full bridge circuit, wherein the leakage inductance value Le of the transformer satisfies:

$$\frac{(C_1 + C_2)V_{in}^2}{I_{ave}^2} \geq L_e \geq \frac{(C_1 + C_2)V_{in}^2}{I_{peak}^2} \text{ and,}$$

$$\frac{(C_3 + C_4)V_{in}^2}{I_{ave}^2} \geq L_e \geq \frac{(C_3 + C_4)V_{in}^2}{I_{peak}^2},$$

where C1 is a value of a capacitance component between a first terminal and a second terminal of the first switching element, C2 is a value of a capacitance component between a first terminal and a second terminal of the second switching element, C3 is a value of a capacitance component between a first terminal and a second terminal of the third switching element, and C4 is a value of a capacitance component between a first terminal and a second terminal of the fourth switching element.

10. The power converter according to claim 9, further comprising:

a first capacitor; a second capacitor; a third capacitor; and a fourth capacitor, wherein each of the first to fourth capacitors is connected parallel to the first terminal and the second terminal of a corresponding one of the first to fourth switching elements, wherein the value C1 includes a value of a capacitance component of the first capacitor, wherein the value C2 includes a value of a capacitance component of the second capacitor, wherein the value C3 includes a value of a capacitance component of the third capacitor, and wherein the value C4 includes a value of a capacitance component of the fourth capacitor.

\* \* \* \* \*